United States Patent
Shukla

(10) Patent No.: US 11,595,414 B2
(45) Date of Patent: Feb. 28, 2023

(54) THREAT MITIGATION IN A VIRTUALIZED WORKLOAD ENVIRONMENT USING SEGREGATED SHADOW WORKLOADS

(71) Applicant: VMware, Inc., Palo Alto, CA (US)

(72) Inventor: Pawan Shukla, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 469 days.

(21) Appl. No.: 16/731,580

(22) Filed: Dec. 31, 2019

(65) Prior Publication Data
US 2021/0203681 A1 Jul. 1, 2021

(51) Int. Cl.
*H04L 29/06* (2006.01)
*H04L 9/40* (2022.01)
*G06F 9/455* (2018.01)

(52) U.S. Cl.
CPC ...... *H04L 63/1425* (2013.01); *G06F 9/45558* (2013.01); *H04L 63/02* (2013.01); *G06F 2009/45562* (2013.01); *G06F 2009/45587* (2013.01); *G06F 2009/45595* (2013.01)

(58) Field of Classification Search
CPC . H04L 63/1425; H04L 63/1416; H04L 63/02; G06F 2009/45562
See application file for complete search history.

(56) References Cited

U.S. PATENT DOCUMENTS

| 5,802,475 A * | 9/1998 | Kishida | H04W 60/04 455/511 |
| 2008/0098476 A1* | 4/2008 | Syversen | H04L 63/0227 726/23 |
| 2016/0077881 A1* | 3/2016 | Anderson | G06F 9/4881 718/104 |
| 2017/0310701 A1* | 10/2017 | Cudak | H04L 63/1441 |
| 2020/0364193 A1* | 11/2020 | Zhou | G06F 16/2423 |
| 2021/0203681 A1* | 7/2021 | Shukla | H04L 63/0272 |
| 2022/0083916 A1* | 3/2022 | Khan | G06N 20/20 |

* cited by examiner

Primary Examiner — Dao Q Ho

(57) ABSTRACT

The technology disclosed herein enables the detection and subsequent mitigation of threats in virtualized workload environments. In a particular embodiment, a method provides, in a workload orchestration platform, managing one or more first logical networks that include a plurality of first workloads and a plurality of shadow workloads. One or more initial processes of the shadow workloads, when instantiated, are known to a security application. The method further includes providing security permissions to the security application that enable the security application to manage the shadow workloads. Also, the method includes providing admin permissions to an administrator application that enable the administrator application to manage the first workloads irrespective of the shadow workloads.

20 Claims, 6 Drawing Sheets

THREAT MITIGATION IN A VIRTUALIZED WORKLOAD ENVIRONMENT USING SEGREGATED SHADOW WORKLOADS

TECHNICAL BACKGROUND

Network security is a major consideration when operating computing workload environments, such as a data center. Given the nature of modern threats to computing environments, the likelihood of the computing environment encountering an attack, or other type of threat, is very high. Fortunately, once a threat has been detected, tools available to the computing environment (e.g., firewalls, antivirus applications, etc.) are typically well suited to remediating the threat. Although threat remediation may be considered relatively easy using the available tools, remediation can only be performed once a threat is actually detected. Threat detection gets harder as more computing assets are positioned in remote locations and/or use different hosting services. For example, rather than a data center for a business simply being located on premises for that business, the data center may be spread across multiple geographic locations. Additionally, cloud infrastructure may be used to locate at least a portion of the data center on computing resources provided by one or more cloud computing services. Not only does the distributed nature of such a data center provide numerous points in which the data center can be infiltrated, each location and service that hosts a portion of the data center may employ different security monitoring schemes. Also, the sheer number of workloads and applications that may be executing in a modern data center make it hard to differentiate between authorized and unauthorized processes.

SUMMARY

The technology disclosed herein enables the detection and subsequent mitigation of threats in virtualized workload environments. In a particular embodiment, a method provides, in a workload orchestration platform, managing one or more first logical networks that include a plurality of first workloads and a plurality of shadow workloads. One or more initial processes of the shadow workloads, when instantiated, are known to a security application. The method further includes providing security permissions to the security application that enable the security application to manage the shadow workloads. Also, the method includes providing admin permissions to an administrator application that enable the administrator application to manage the first workloads irrespective of the shadow workloads.

In another example, an apparatus is provided having one or more computer readable storage media and a processing system operatively coupled with the one or more computer readable storage media. Program instructions stored on the one or more computer readable storage media, when read and executed by the processing system, direct the processing system to provide at least a portion of a workload orchestration platform. In the workload orchestration platform manage one or more first logical networks that include a plurality of first workloads and a plurality of shadow workloads. One or more initial processes of the shadow workloads, when instantiated, are known to a security application. The program instructions further direct the processing system to provide security permissions to the security application that enable the security application to manage the shadow workloads. Also, the program instructions direct the processing system to provide admin permissions to an administrator application that enable the administrator application to manage the first logical networks and the first workloads irrespective of the shadow workloads.

DETAILED DESCRIPTION

Workload orchestration platforms, like those described herein, facilitate the virtualization of workloads (e.g., virtual machines, containers, etc.) on physical host computing systems. The physical host computing systems may be located in different geographic locations and/or may, at least in part, be supplied by one or more cloud computing services, as discussed above. Virtualizing workloads on these physical host computing systems allows for processing flexibility in part because the workloads can be instantiated as needed on a variety of systems. For example, if local computing resources cannot support the number of workloads needed for a particular task, a cloud computing service may be contracted to host additional workloads. The workload orchestration platform further creates logical overlay networks, referred to herein simply as logical networks, to connect the virtualized workloads. A logical network overlays on networking layers that connect the physical host computing systems to form a network between the workloads that is independent of the physical infrastructure over which the logical network operates.

Many types of security threats are typically blind with respect to the systems they attack. As such, a threat may scan a network to identify endpoints that can be compromised with one or more anomalous processes (e.g., threat processes or processes that a workload administrator would otherwise not want or need to be executing on a workload). The network and the endpoints may include the logical networks and virtualized workloads discussed above. The workload orchestration platforms discussed below take advantage of the blind nature of security threats by providing "shadow" workloads that exist for identifying threats rather than for handling processing tasks like those assigned to other workloads. These shadow workloads are implemented on the same logical networks created for the workloads performing processing tasks and, at the time of instantiation, the processes executing in each shadow workload are known. As such, when a security threat attempts to gain access to the workloads on a particular logical network, the security threat also attempts to gain access to the shadow workloads, as the security threat does not differentiate between types of workloads. Since the processes that are supposed to be executing on the shadow workloads are known, any additional process that a security threat implements in a shadow workload can be identified as being a process that is not one of those known processes. In contrast, the process executed by the security threat would typically be much harder to detect in the other workloads due to even the desired processes executing on those workloads not already being known. As such, it may be hard, or even impossible, to determine whether the security-threat process is an undesired process within all the other processes executing on the workload.

Figure 1:
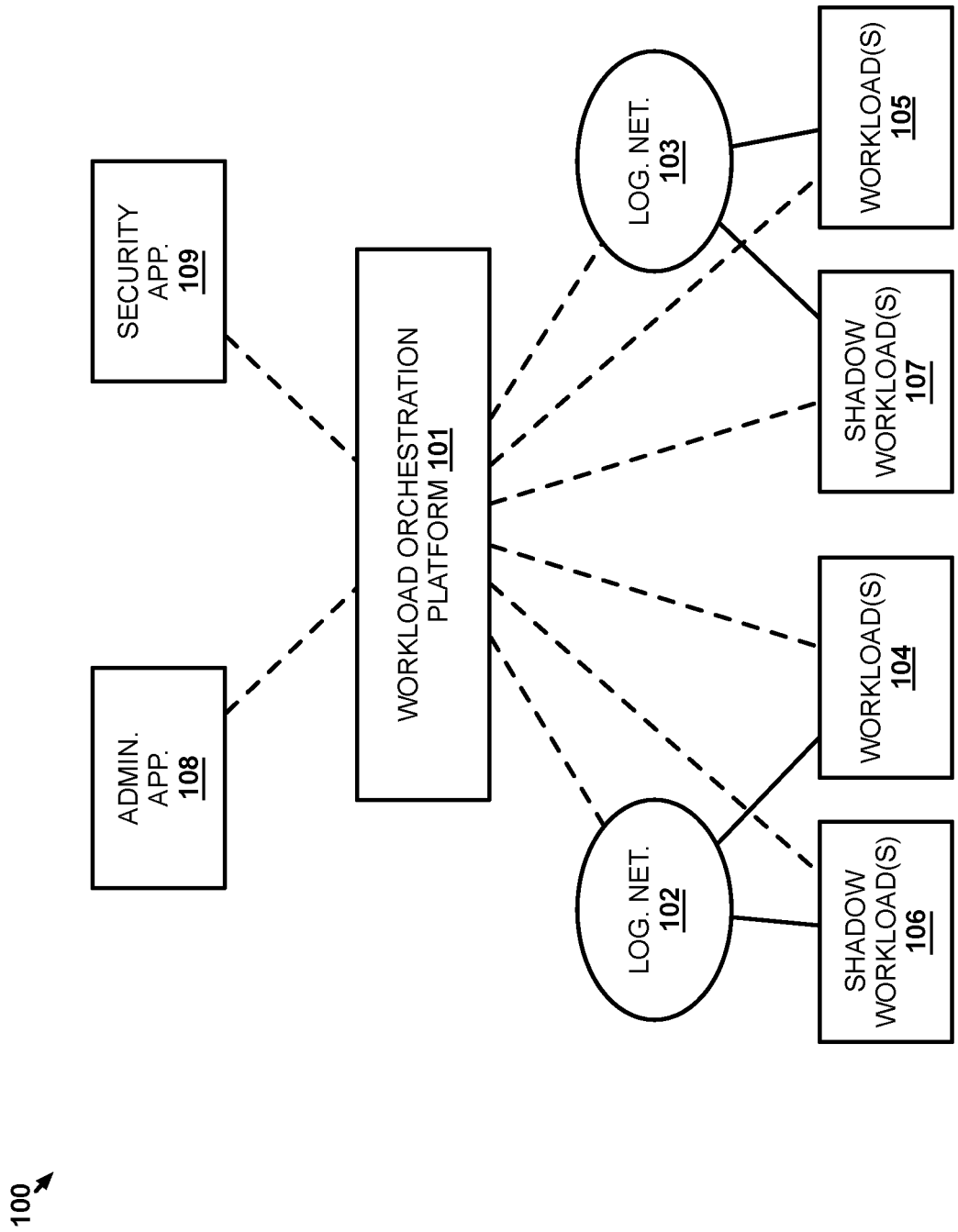
FIG. 1 illustrates an implementation for mitigating threats to a virtualized workload environment using segregated shadow workloads.

FIG. 1 illustrates implementation 100 for mitigating threats to a virtualized workload environment using segregated shadow workloads. Implementation 100 includes workload orchestration platform 101, logical networks 102, 103, one or more workloads 104, 105, one or more shadow workloads 106, 107, administrator application 108, and security application 109. Elements 101-109 all operate on physical computing (e.g., host computing systems) and network hardware (e.g., switches, routers, etc. connecting the host computing systems) that is not shown for clarity. The solid lines represent logical communication links for a data plane between elements while the dashed lines represent logical communication links for a control plane between elements. In particular, the control plane logical links are used for communications that control the establishment and management of workloads 104-107 and logical networks 102-103. The data plane logical links are the logical links over which workloads 104-106 exchange communications related to the performance of their respective processing tasks. While not shown, there may be data plane logical links connecting logical network 102 and logical network 103 or connecting one or more other networks, such as other logical networks and/or the Internet, to logical network 102 and/or logical network 103.

Workload orchestration platform 101 may comprise one or more orchestrators, managers, and controllers (not shown). Each component of orchestration platform may be implemented as an individual application running on a physical computer machine, or distributed across a cluster of machines, or distributed across hosts and interact with one another via APIs or other inter-process mechanisms. In operation, workload orchestration platform 101 handles the instantiation, removal, and configuration of workloads on host computing hardware available to workload orchestration platform 101. For example, an orchestrator may detect stress among a plurality of instances of an application and determine it needs to be scaled out by instantiating new workloads to take on some of the load from existing instances. Therefore, it may instruct a compute manager to deploy additional workloads containing instances of the application and instruct a network manager to connect the additional workloads to an existing logical overlay network. The managers may then generate instructions and communicate requirements to selected hosts either directly or via a control plane made up of one or more controllers.

The workloads may be virtual machines, containers, or any other type of virtualized computer processing component. Likewise, workload orchestration platform 101 handles the configuration of one or more networks, such as logical network 102 and logical network 103, that connect the workloads under workload orchestration platform 101's management. Security application 109, which may simply be a web browser in communication with a component of workload orchestration platform 101, communicates with workload orchestration platform 101 to instantiate, remove, monitor, and/or otherwise configure shadow workloads that security application 109 uses to detect security threats. For example, security application 109 may provide workload orchestration platform 101 with a template for a shadow workload and provide instructions for when a shadow workload should be instantiated from that template (e.g., the instructions may indicate that workload orchestration platform 101 should implement one shadow workload per logical network managed by workload orchestration platform 101).

Administrator application 108, which may simply be a web browser in communication with a component of workload orchestration platform 101, communicates with workload orchestration platform 101 to instantiate, remove, monitor, and/or otherwise configure workloads other than shadow workloads. For example, administrator application 108 may instruct workload orchestration platform 101 to instantiate workloads to accomplish a particular task (e.g., to host a website). Like security application 109, administrator application 108 may provide workload orchestration platform 101 with one or more templates for one or more workloads that will perform the desired task. Administrator application 108 may further instruct workload orchestration platform 101 regarding how many instances of each workload are needed at any given time (e.g., based on current demand for the processing provided by the workload). Workload orchestration platform 101 may then instantiate the workloads on one or more host computing systems in accordance with administrator application 108's instructions. Administrator application 108 and security application 109 may be server-side applications or may, at least in part, execute on a personal user system (e.g., a laptop or desktop computer workstation) though which user input is received from a user or information is conveyed to the user, e.g., using a web browser. For example, administrator application 108 and/or security application 109 may execute at a component of workload orchestration platform 101, with user interfaces exported to datacenter administrators or security administrators via a web interface. The administrator application and the security application may be commonly implemented as different views of an orchestrator interface based, e.g., on permissions granted to the person accessing the interface. In other examples, workload orchestration platform 101 may receive instructions from more than one administrator application 108 to manage workloads on behalf of more than one administrator application 108.

As described in more detail below, workload orchestration platform 101 segregates the management of shadow workloads 106, 107 from other workloads 104, 105 that are being managed by workload orchestration platform 101. Since shadow workloads 106, 107 are instantiated independently from workloads 104, 105 and are not intended to have any operational affect on workloads 104, 105, workload orchestration platform 101 does not allow administrator application 108 to affect shadow workloads 106, 107. Workload orchestration platform 101 also does not allow security application 109 to affect workloads 104, 105. Similarly, the known processes executing on shadow workloads 106, 107 when instantiated are not processes that will affect the operation of workloads 104, 105. As such, the processing tasks being performed by workloads 104, 105 will not be affected by the existence of shadow workloads 106, 107.

Figure 2:
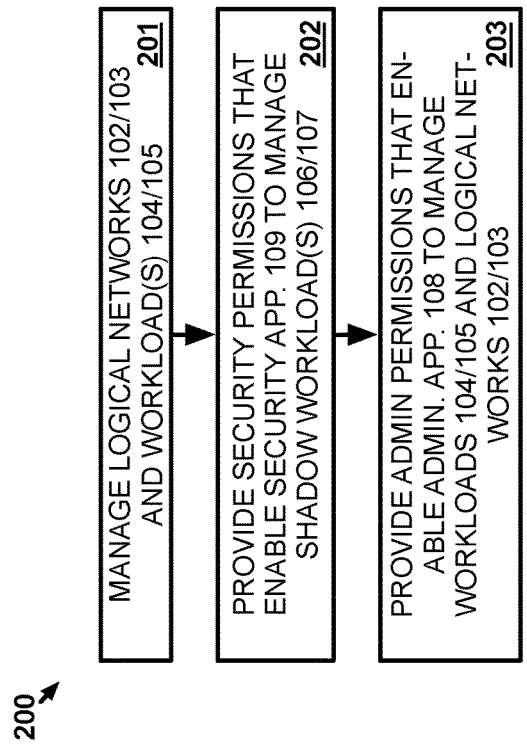
FIG. 2 illustrates an operation for mitigating threats to a virtualized workload environment using segregated shadow workloads.

FIG. 2 illustrates flow chart 200 illustrating by way of example a method for mitigating threats to a virtualized workload environment using segregated shadow workloads. The following description is made with reference to FIG. 1, and with method steps designated by the corresponding reference number in parentheses. In operation, workload orchestration platform 101 manages logical network 102 and logical network 103 that include respective workloads 104, 105 and shadow workloads 106, 107 (201). As mentioned above, the initial processes executing on shadow workloads 106, 107 are known to security application 109. This allows security application 109 to easily recognize any additional process(es) that subsequently begin executing on one or more of shadow workload(s) 106 and shadow workload(s) 107.

Workload orchestration platform 101 provides security permissions to security application 109 that enable security application 109 to manage (e.g., add, remove, configure, etc.) shadow workloads, which include shadow workloads 106, 107 (202). The security permissions may also explicitly prohibit security application 109 from managing or otherwise affecting workloads 104, 105, although, such a prohibition may be implicit in the security permissions not enabling management of workloads other than shadow workloads. Providing the security permissions to security application 109 may comprise workload orchestration platform 101 simply complying with shadow workload management requests from security application 109 or may comprise transferring security permissions related information to security application 109. The security permissions information may inform security application 109 of the security permissions, may include information necessary for security application 109 to be authenticated by workload orchestration platform 101 for controlling shadow workloads 106, 107 (e.g., a secure token), or any other information relevant to allowing security application 109 to manage shadow workloads 106, 107.

Similarly, workload orchestration platform 101 provides admin permissions to administrator application 108 that enable administrator application 108 to manage (e.g., add, remove, configure, etc.) workloads associated with administrator application 108, which are workloads 104, 105 in this example, irrespective of shadow workloads 106, 107 (203). The admin permissions may also explicitly prohibit administrator application 108 from managing or otherwise affect shadow workloads 106, 107, although, such a prohibition may be implicit in the admin permissions not enabling management of workloads other than workloads associated with administrator application 108. In some examples, the admin permissions do not allow administrator application 108 to even be aware of the existence of shadow workloads 106, 107. In other examples, the admin permissions may allow administrator application 108 to be aware that shadow workloads 106, 107 are present on the logical networks, while still not allowing administrator application 108 to affect shadow workloads 106, 107. Providing the admin permissions to administrator application 108 may comprise workload orchestration platform 101 simply complying with workload management requests from administrator application 108 for workloads under the purview of administrator application 108 (i.e., workloads 104, 105 in this example) or may comprise transferring admin permissions related information to administrator application 108. Admin permissions information may inform administrator application 108 of the admin permissions, may include information necessary for an administrator accessing administrator application 108 to be authenticated by workload orchestration platform 101 for controlling shadow workloads 104, 105 (e.g., a secure token), or any other information relevant to allowing administrator application 108 to manage workloads 104, 105. In some examples, the admin permissions may further enable administrator application 108 to manage logical networks 102, 103 (e.g., creation of logical network 102, 103, assignment of workloads to a particular network, firewall configurations, etc.), although, in other examples, workload orchestration platform 101 may itself handle at least a portion of the management of logical networks 102, 103.

The security permissions, admin permissions, shadow workloads 106, 107 discussed above allow workloads 104, 105 to operate without being affected by, or even being aware of, the threat detection occurring via shadow workloads 106, 107. Likewise, administrator application 108 is able to manage workloads 104, 105, and possibly logical networks 102, 103 without affecting, or even being aware of, shadow workloads 106, 107. Security application 109, shadow workloads 106, 107 are similarly unable to affect the operation workloads 104, 105.

Figure 3:
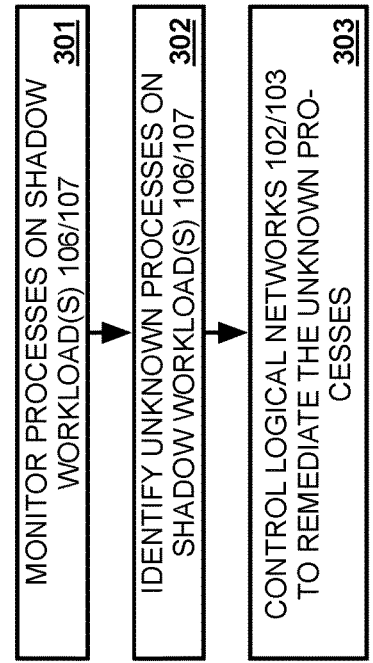
FIG. 3 illustrates another operation for mitigating threats to a virtualized workload environment using segregated shadow workloads.

FIG. 3 shows a flowchart 300 illustrating by way of example a method for mitigating threats to a virtualized workload environment using segregated shadow workloads. Security application 109 performs (or causes to be performed) the method illustrated in flowchart 300 in conjunction with workload orchestration platform 101 to detect security threats by identifying anomalous activity with respect to shadow workloads 106, 107 (e.g., unknown processes executing thereon and/or unexpected network traffic exchanged therewith). In particular, security application 109 monitors processes on shadow workloads 106, 107 (301). In some examples, security application may further monitor network traffic exchanged with shadow workloads 106, 107. In some examples, security application 109 already knows that shadow workloads 106, 107 exist and knows the information needed (e.g., network addresses) to contact shadow workloads 106, 107. For instance, security application 109 may explicitly instruct workload orchestration platform 101 to instantiate each of shadow workloads 106, 107 and is provided with contact information by workload orchestration platform 101 upon instantiation of each respective shadow workload.

In other examples, workload orchestration platform 101 may be tasked with instantiating shadow workloads 106, 107 such that security application 109 needs to be informed of each shadow workload's existence along with contact information for each respective shadow workload. The contact information for each shadow workload may be requested by security application 109 or may be pushed to security application 109 by workload orchestration platform 101 either periodically or upon instantiation of a new shadow workload. In these examples, security application 109 may provide workload orchestration platform 101 with rules for instantiating shadow workloads. The rules may include pre-defined templates and/or heuristic models defining when a shadow workload should be instantiated. For instance, the rules may indicate that one shadow workload should be implemented per logical network or subnetwork, one shadow workload per host computing system, one shadow workload per host computing systems' geographic location, one shadow workload per a predefined number of other workloads on a logical network, or any other manner of defining conditions for when a shadow workload should be created—including combinations thereof. In some examples, the rules may call for different types of shadow workloads to be instantiated depending on the type of other workloads currently executing. For example, when workloads on a logical network are running on a particular operating system, then the rules may call for instantiation of a shadow workload that also runs on that operating system. Similarly, if the workloads on a network are running multiple different operating systems, then the rules may call for instantiation of multiple shadow workloads running the respective operating systems so as to entice threats that target all applicable operating systems.

In some examples, one or more of the processes known to be executing on shadow workload 106, 107 are monitoring processes that are configured to monitor processes executing on shadow workloads 106, 107 and to report process information about the executing processes to security application 109. In some examples, one or more of the known processes may include a network traffic monitoring process that reports information about network traffic exchanged with shadow workloads 106, 107. In some examples, a hypervisor, or other type of host software, that handles the hosting of shadow workloads 106, 107 may be accessible for configuration by security application 109. In those cases, the hypervisor may be tasked with at least a portion of the monitoring of shadow workloads 106, 107 in place of processes executing thereon. For instance, network traffic exchanged with shadow workloads 106, 107 passes through the hypervisor and the hypervisor may monitor that network traffic for the purposes of identifying unknown processes on shadow workloads 106, 107.

From the monitoring of shadow workloads 106, 107, security application 109 identifies one or more unknown processes on one or more of shadow workloads 106, 107 (302). Since security application 109 knows which processes are supposed to be executing on shadow workloads 106, 107 (e.g., those processes that existed when shadow workloads 106, 107 were instantiated, processes executed at the instruction of security application 109, or processes that are otherwise known to security application 109 as being allowed to execute—including combinations thereof), security application 109 can presume that any unknown processes identified during the monitoring of shadow workloads 106, 107 are also unwanted processes, or processes that are otherwise not intended to be executing and may be malicious.

Once the unknown processes have been identified, security application 109 controls logical network 102 and/or 103 to remediate the unknown processes (303). In particular, security application 109 may direct workload orchestration platform 101 to implement one or more firewall rules in logical network 102 and/or 103 that blocks network traffic exchanged by the unknown processes. By blocking the unknown process traffic, the unknown processes are likely prevented from performing their intended function, which remediates a security threat posed by the unknown processes. In some examples, the firewall rule may only be implemented for the ones of logical networks 102, 103 in which the unknown processes were identified while, in other examples, the firewall rule may be implemented in all logical networks under the purview of security application 109 as a precaution. Characteristics of the network traffic exchanged by the unknown process (e.g., network address(es) used, protocol(s) used, type of information exchanged, etc.) may have been identified during the monitoring of shadow workloads 106, 107. Security application 109 uses those characteristics when defining the network traffic that should be blocked by a firewall rule.

In some examples, security application 109 may identify the unknown processes to either administrator application 108 or workload orchestration platform 101. Since the security permissions do not allow security application 109 to affect workloads 104, 105, security application 109 cannot take action to remove the unknown processes from those of workloads 104, 105 on which the unknown processes are also executing. By notifying administrator application 108 and/or workload orchestration platform 101, administrator application 108 and workload orchestration platform 101 can choose to take action and remove any unknown processes. Similarly, in some examples, security application 109 may query administrator application 108 or workload orchestration platform 101 about the unknown processes to confirm that they are unknown before security application 109 takes remedial action. Other manners of remediating the security threat posed by the unknown processes may also be used.

Figure 4:
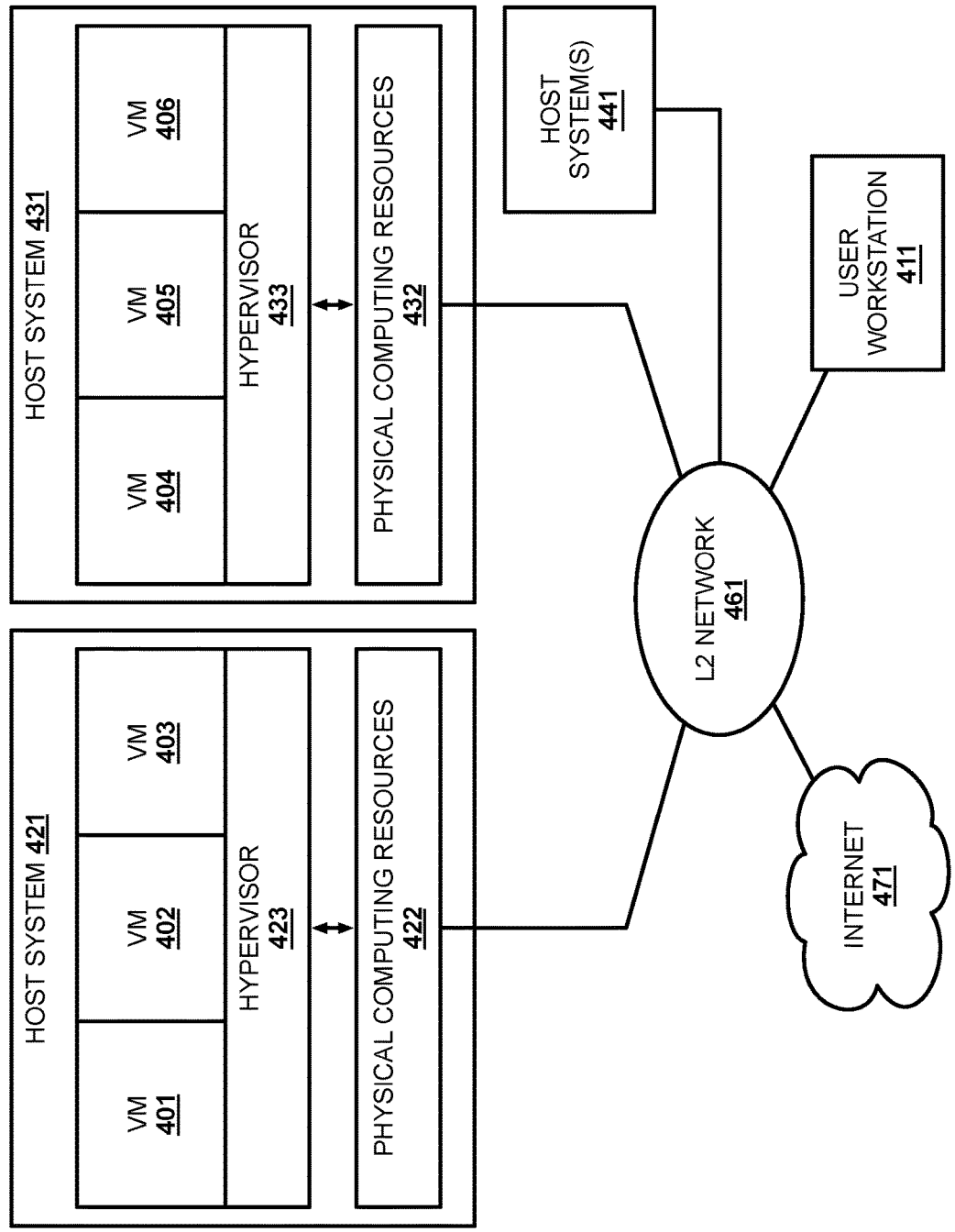
FIG. 4 illustrates another implementation for mitigating threats to a virtualized workload environment using segregated shadow workloads.

FIG. 4 illustrates implementation 400 for mitigating threats to a virtualized workload environment using segregated shadow workloads. Implementation 400 includes host computing systems 421, 431, and 441, user workstation 411, Level 2 (L2) network 461, and Internet 471. While host computing systems 421, 431, and 441, and user workstation 411 are all connected to L2 network 461 (which may be a local area network) in this example, one or more of those elements may be connected to another L2 network in communication with L2 network 461 over Internet 471. For example, host computing systems 421 and 431 may be located on-site at an enterprise and one or more of host computing systems 441 may be located in a facility of a cloud computing service provider.

User workstation 411 comprises a personal computer, laptop, tablet, or other type of user operated computing system that a user, such as a process administrator, may use to administer virtual machines on host computing systems 421, 431, and 441. L2 network 461 includes one or more L2 network switches, hubs, etc., and connects host computing systems 421, 431, and 441, and user workstation 411. L2 network 461 further connects Internet 471 to host computing systems 421, 431, and 441 and user workstation 411.

In this example, host computing system 421 executes hypervisor 423 to allocate physical computing resources 422 among virtual machines 401-403. Likewise, host computing system 431 executes hypervisor 433 to allocate physical computing resources 432 among virtual machines 404-406. Physical computing resources 422 and 432 include processing resources (e.g., processing circuitry, such as Central Processing Unit(s) (CPUs) and Graphics Processing Unit(s) (GPU), Application Specific Integrated Circuits (ASICs) etc.), memory resources including one or more computer readable storage media (e.g., random access memory, hard disk drive(s), flash memory, etc. while in no examples would a storage medium of the memory resources be a propagated signal), network interface circuitry, user interfaces, or any other type of computing resource that a physical computing system may include.

It should be understood that the distribution virtual machines 401-406 evenly across two host computing systems, as shown in FIG. 4, is merely exemplary. Virtual machines 401-406 shown are representative of any number of virtual machines that may be implemented on any number of host computing systems.

Host computing system(s) 441 have similar structure to that of host computing systems 421, 431. As such, host computing system(s) 441 may similarly host one or more virtual machines via respective hypervisors. For example, as additional virtual machines are needed based on demand for a service provided by the virtual machines, then the additional virtual machines may be instantiated on one or more of host computing system(s) 441.

Figure 5:
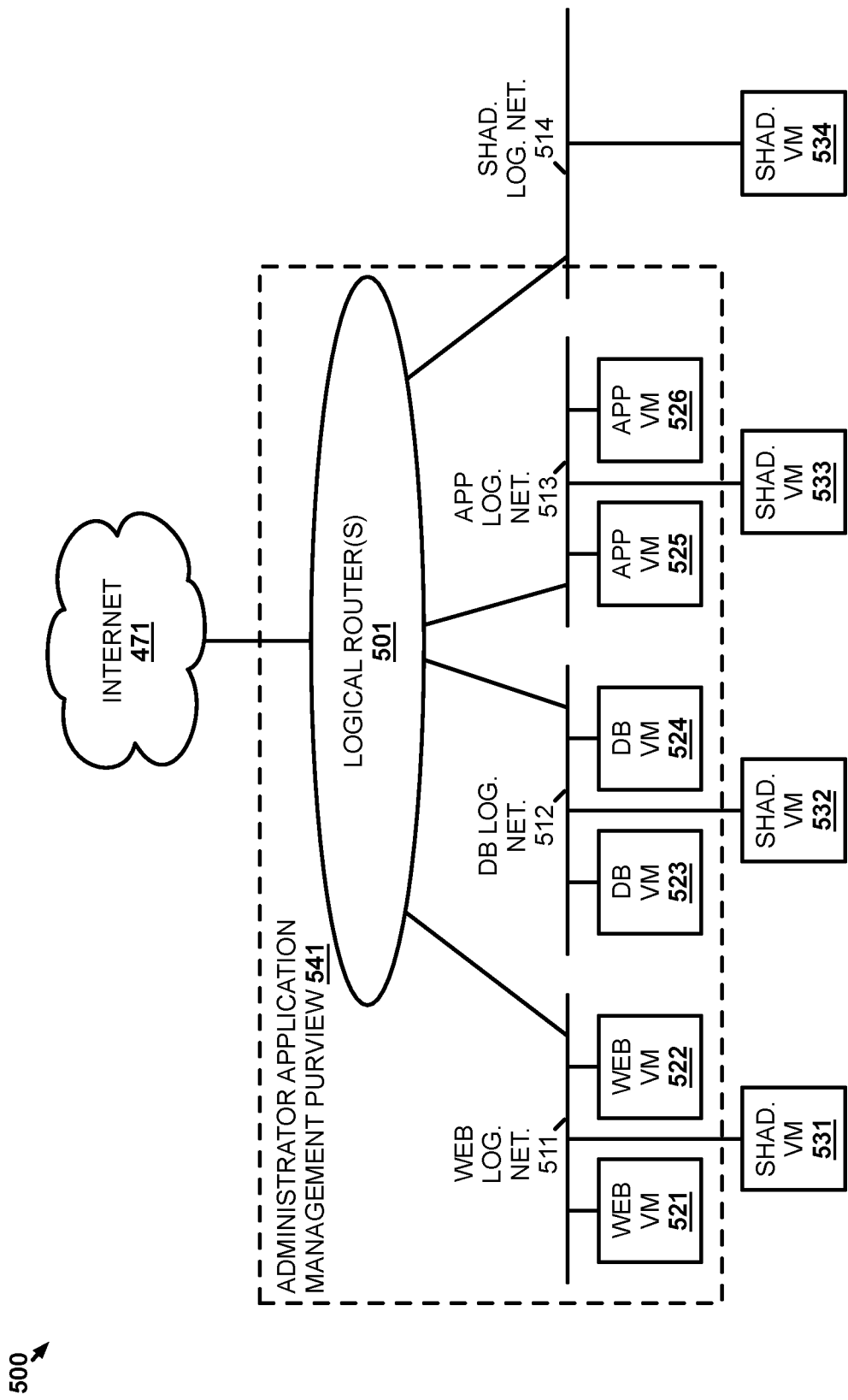
FIG. 5 illustrates an overlay network environment for mitigating threats to a virtualized workload environment using segregated shadow workloads.

FIG. 5 illustrates an overlay network environment 500 for mitigating threats to the virtualized workload environment using segregated shadow workloads. Overlay network environment 500 is an example data plane where the workloads of implementation 100 are virtual machines. In particular, overlay network environment 500 implements two instances of a three-tier web application. One instance is implemented using web virtual machine 521 for one tier, database virtual machine 523 for a second tier, and application virtual machine 525 for a third tier. Another instance is implemented using web virtual machine 522 for the one tier, database virtual machine 524 for the second tier, and application virtual machine 526 for the third tier. Each of the virtual machines in overlay network environment 500, and discussed in the examples below, are virtual machines executing on host computing system 421, host computing system 431, and host computing system(s) 441, such as virtual machines 401-406.

Each application tier is segregated onto its own logical overlay network that is overlaid on the physical and virtualized networking and computing resources provided in implementation 400. As such, web virtual machines 521, 522 are part of web logical network 511, database virtual machines 523, 524 are part of database logical network 512, and application virtual machines 525, 526 are part of application logical network 513. In this example, web logical network 511 also includes shadow virtual machine 531, database logical network 512 also includes shadow virtual machine 532, and application logical network 513 also includes shadow virtual machine 533. That arrangement may have resulted from a rule(s) for creating shadow virtual machines indicating that one shadow virtual machine should be implemented per logical network. In this case, the rules further indicated that a separate shadow network should be created having nothing but a shadow virtual machine thereon. Accordingly, overlay network environment 500 also includes shadow logical network 514 and shadow virtual machine 534 thereon.

Web logical network 511, database logical network 512, application logical network 513, and shadow logical network 514 exchange communications between each other and with Internet 471 via one or more logical routers 501. Logical routers 501 may be implemented using one or more virtual machines from implementation 400 or may, at least in part, be implemented within the hypervisors, such as hypervisors 423, 433. Though not shown, overlay network environment 500 may include one or more network firewall functions that are used to regulate network traffic exchanged between web logical network 511, database logical network 512, application logical network 513, shadow logical network 514, and Internet 471. The network firewall functions may be implemented using one or more virtual machines from implementation 400 or may, at least in part, be implemented within the hypervisors, such as hypervisors 423, 433. Additionally, though not shown, one or more of the virtual machines in implementation 400 may be edge systems that regulate network traffic exchanged with Internet 471. In some examples, the edge systems may include a portion of the network firewall functions discussed above.

Administrator application management purview 541 represents the portion of overlay network environment 500 that is under the purview of an administrator application, such as administrator application 108, that administers the three-tier application implemented by virtual machines 521-526. The administrator application may be running in one or more of the virtual machines of implementation 400. Additionally, at least a component of the administrator application may be executing on or accessed by user workstation 411. A user may operate user workstation 411 via user workstation 411's user interface to provide instructions to how administrator application management purview 541 should provide the three-tier application (e.g., how many instances are required per number of clients accessing the three-tier application) and to be presented with information about three-tier application (e.g., a number of virtual machines executing to provide the application, what logical networks each virtual machine is on, firewall information, etc.).

In operation, the administrator application cannot view, or cannot modify or configure, shadow virtual machines 531-534 and shadow logical network 514 and that fact is reflected in admin permissions that do not allow the administrator application to affect shadow virtual machines 531-534 and shadow logical network 514. Accordingly, shadow virtual machines 531-534 and shadow logical network 514 are shown outside the box representing administrator application management purview 541. In some examples, administrator application management purview 541 may mean that the administrator application is not even aware of the existence of shadow virtual machines 531-534 and shadow logical network 514. A user operating user workstation 411 to interact with the administrator application would therefore also not be presented with information indicating the existence of shadow virtual machines 531-534 and shadow logical network 514 via the administrator application. In other examples, the administrator application may have permissions that allow it to know of the existence of shadow virtual machines 531-534 and shadow logical network 514 even though the permissions do not allow the administrator application to affect shadow virtual machines 531-534 and shadow logical network 514 in any way. In those examples, a user operating user workstation 411 to interact with the administrator application may be able to view information indicating the existence of shadow virtual machines 531-534 and shadow logical network 514 via the administrator application but would not be able to affect the operation of shadow virtual machines 531-534 and shadow logical network 514. Allowing a user to at least be aware of shadow virtual machines 531-534 and shadow logical network 514 may provide the user with peace of mind for knowing that threat detection is operating properly. For example, the user may be presented with a graphic representing overlay network environment 500 and the boxes for shadow virtual machines 531-534 and shadow logical network 514 may be greyed out to indicate they cannot be affected.

Figure 6:
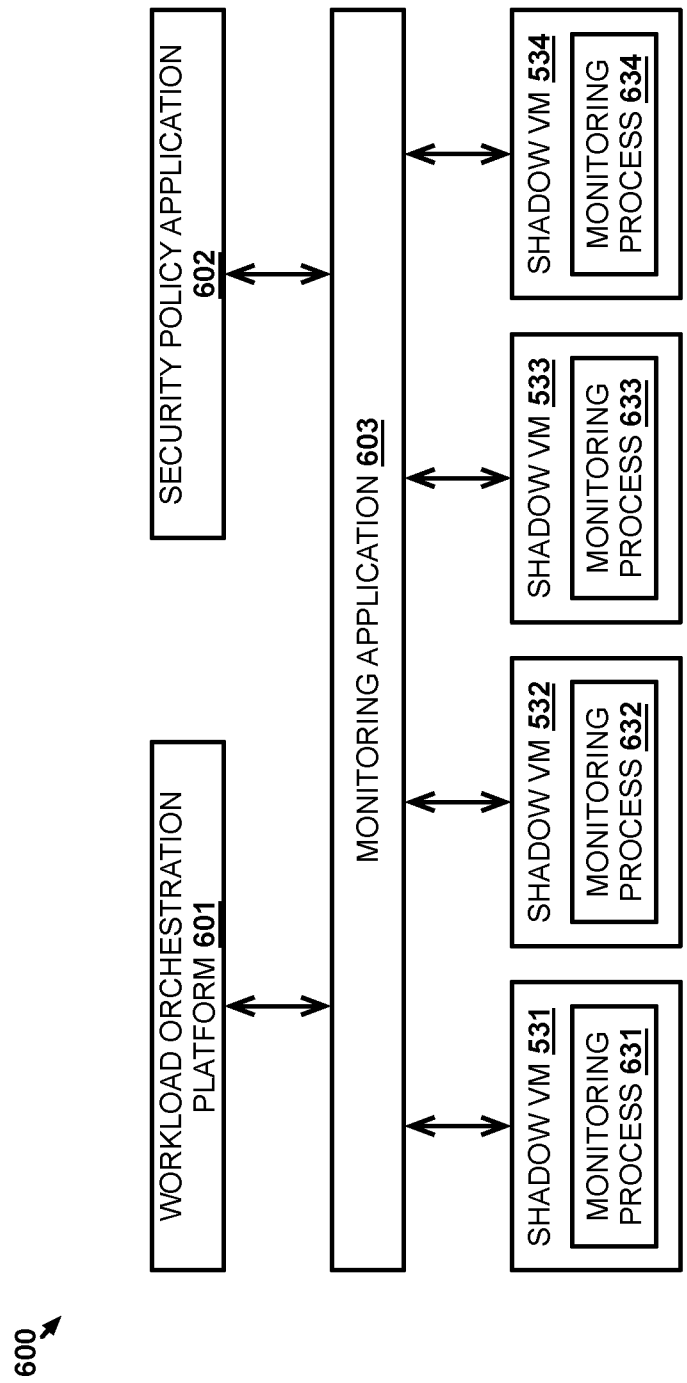
FIG. 6 illustrates a shadow workload environment for mitigating threats to a virtualized workload environment using segregated shadow workloads.

FIG. 6 illustrates shadow workload environment 600 for mitigating threats to a virtualized workload environment using segregated shadow workloads. Shadow workload environment 600 includes workload orchestration platform 601, security policy application 602, monitoring application 603, and shadow virtual machines 531-534. Shadow workload environment 600 represents elements of a control plane for shadow virtual machines 531-534 in overlay network environment 500 described above with reference to FIG. 5. While not shown, a logical overlay network apart from those described with respect to overlay network environment 500 may be used to exchange communications between elements in shadow workload environment 600. That other logical overlay network may be used for the communications between the elements of shadow workload environment 600 while keeping those communications separate from logical networks 511-514. In some examples, the other logical network may be part of a control plane for the virtual machines in overlay network environment 500.

Workload orchestration platform 601 shown orchestrates both shadow workload environment 600 and overlay network environment 500 through a control plane not shown with respect to overlay network environment 500. Workload orchestration platform 601 may include a control application executing on one or more virtual machines to coordinate the operations of the hypervisors. From the orchestration perspective of workload orchestration platform 601, shadow virtual machines 531-534 and shadow logical network 514 are no different than logical networks 511-513 and virtual machines 521-526. Similarly, to any security threat attempting to infiltrate overlay network environment 500 (e.g., from Internet 471), the logical networks 511-514 and virtual machines 521-526/531-534 are all potential targets. However, admin permissions and security permissions similar to those discussed above, which are provided by workload orchestration platform 601, mean that management of shadow virtual machines 531-534 and shadow logical network 514 by security policy application 602 and monitoring application 603 is segregated from management of the elements in administrator application management purview 541.

Security Policy Application 602 and monitoring application 603 are examples of components that may be included security application 109 in situations where security application 109 is not a single application instance. Security policy application 602 and monitoring application 603 may each be implemented in the same virtual machine or may be implemented in different virtual machines or on bare metal servers or in containers, or in cloud-based environments, etc. In some examples, at least a portion of either or both of security policy application 602 and monitoring application 603 may be executing on, or otherwise accessed by, a user workstation similar to user workstation 411. For example, a security administrator may operate the user workstation to provide instructions to how security policy application 602 should enforce policies and detect security threats (e.g., may provide input regarding rules for instantiating shadow workloads and shadow logical networks). Additionally, the security administrator may be presented with information about shadow virtual machines 531-534 and shadow logical network 514 (e.g., where shadow virtual machines 531-534 are implemented, security threats detected, remedial actions taken, etc.). In some examples, the security permissions provided by workload orchestration platform 601 to security policy application 602 and monitoring application 603 may allow security policy application 602 and/or monitoring application 603 to recognize the existence of virtual machines 521-526 even though the security permissions do not allow security policy application 602 and monitoring application 603 to manage virtual machines 521-526.

In this example, shadow virtual machines 531-534 execute respective ones of monitoring processes 631-634. In this case, each of monitoring processes 631-634 is represented as a single process although, in other cases, each of monitoring processes 631-634 may comprise multiple processes performing different functions (e.g., one for process execution monitoring and another for network traffic monitoring). Monitoring processes 631-634 perform as described below in operational scenario 700 to enable security policy application 602 and monitoring application 603 to detect security threats to overlay network environment 500.

Figure 7:
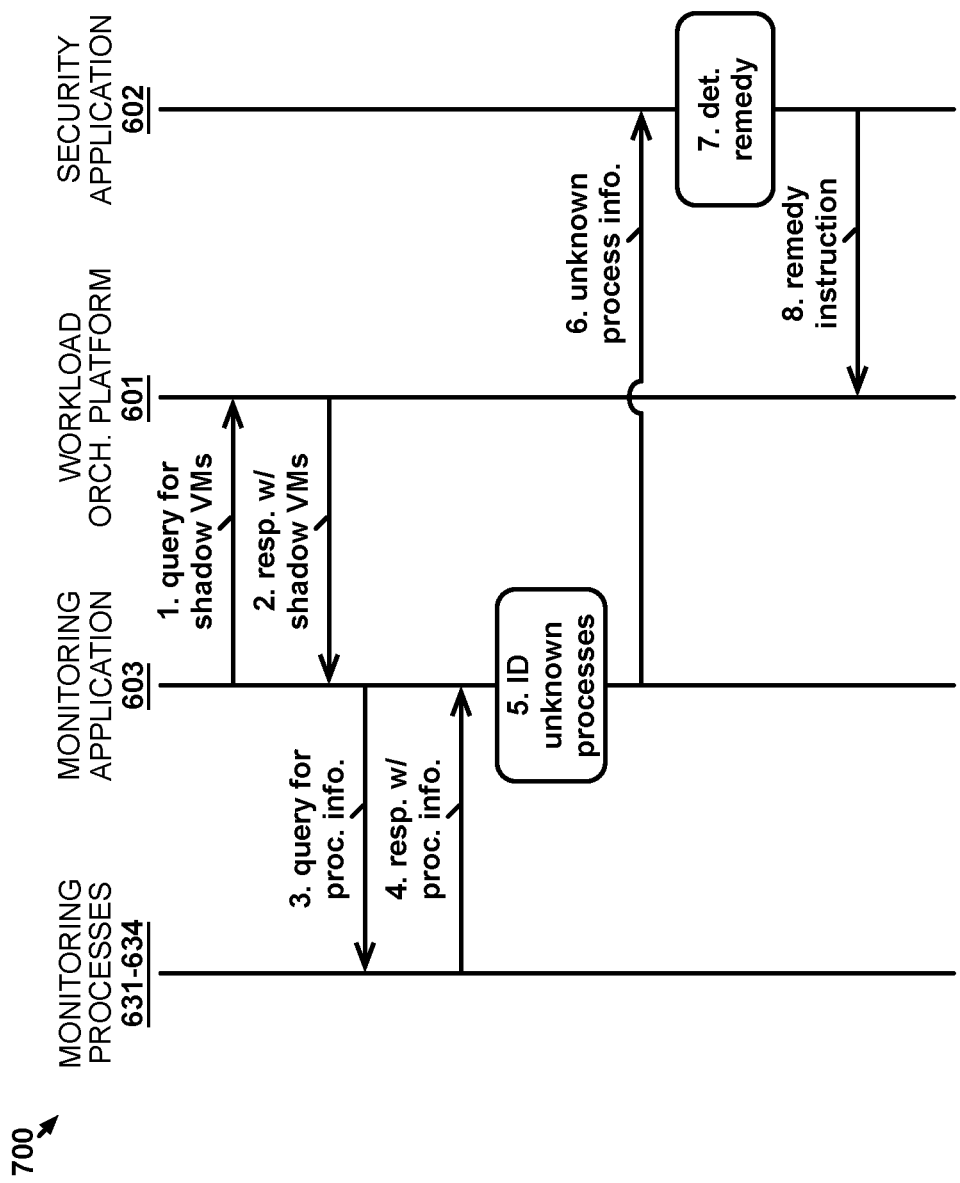
FIG. 7 illustrates an operational scenario for mitigating threats to a virtualized workload environment using segregated shadow workloads.

FIG. 7 illustrates operational scenario 700 for mitigating threats to a virtualized workload environment using segregated shadow workloads. In operational scenario 700, monitoring application 603 is tasked with monitoring processes executing on shadow virtual machines 531-534 to identify unknown processes. In particular, monitoring application 603 queries workload orchestration platform 601 at step 1 for information about shadow virtual machines that have been instantiated by workload orchestration platform 601 and are currently executing, which are shadow virtual machines 531-534 in this example. In some cases, monitoring application 603 may be querying merely for updates (i.e., for information about changes to the shadow virtual machines, such as additions or removals, since monitoring application 603 last queried) or may be requesting all information about the shadow virtual machines.

Security permissions provided by workload orchestration platform 601 to monitoring application 603 allows workload orchestration platform 601 to provide the information about shadow virtual machines 531-534 to monitoring application 603. Accordingly, workload orchestration platform 601 responds to monitoring application 603's query at step 2 by providing information about shadow virtual machines 531-534 to monitoring application 603. In this example, the information about shadow virtual machines 531-534 includes credentials and network addresses needed for monitoring application 603 to communicate with each of shadow virtual machines 531-534 over the control plane's logical network.

Once workload orchestration platform 601 has the information about shadow virtual machines 531-534, monitoring application 603 queries monitoring processes 631-634 periodically at step 3 for process information about processes executing thereon. In response to the queries, monitoring processes 631-634 responds to monitoring application 603 with the process information at step 4. A secure channel may be established between each of shadow virtual machines 531-534 and monitoring application 603 over which at least the process information is transferred. The process information may include information about any type of process executing on shadow virtual machines 531-534 (e.g., kernel modules, software applications, etc.).

After receiving the process information, monitoring application 603 determines at step 5 whether any of the processes identified in the process information are unknown to monitoring application 603 and, therefore, not supposed to be executing on shadow virtual machines 531-534. For example, monitoring application 603 may maintain a list of known processes that can be compared to processes identified in the process information. Any processes in the process information that do not match a process in the list are considered unknown processes. In other examples, monitoring processes 631-634 may be configured to identify the unknown processes themselves. In those examples, the process information received from monitoring processes 631-634 may identify any identified unknown processes so that monitoring application 603 does not need to identify unknown processes from amongst known processes itself.

When one or more unknown processes are identified by monitoring application 603, monitoring application 603 transfers information about the unknown processes at step 6 to security policy application 602. The unknown process information may simply identify the unknown processes (e.g., by process name) or may include additional information about the unknown process. The additional information may include, for example, information about network traffic that one or more of the unknown processes exchanges. The network information may have been included in the process information received by monitoring application 603 at step 4 or may be obtained by monitoring application 603 in a subsequent exchange (e.g., after identifying an unknown process, monitoring application 603 may request the network information about the unknown process).

Upon receiving the unknown process information, security policy application 602 determines a remedy at step 7 to a security threat(s) posed by the unknown processes. The remedy may be a firewall rule, an antivirus signature, or some other action to prevent the unknown processes from performing their intended function. In this example, the remedy is one or more firewall rules intended to block network traffic exchanged by the unknown processes. Depending on the capabilities of workload orchestration platform 601 the firewall rule may be able to define what network traffic should be blocked based on characteristics above typical Layer 3 information (e.g., beyond blocking traffic to/from certain network addresses). For instance, a firewall implemented by workload orchestration platform 601 may be able to identify particular processes that are associated with particular network packets. A firewall rule in those cases could simply be defined as blocking network traffic exchanged with a particular unknown process.

Once the remedy is determined, security policy application 602 instructs workload orchestration platform 601 to implement the remedy at step 8. In this example, workload orchestration platform 601 implements the firewall rules of the remedy in the firewall functions of overlay network environment 500. The firewall functions then block network traffic associated with the identified unknown processes. While security policy application 602 and monitoring application 603 only know that the unknown processes are executing on one or more of shadow virtual machines 531-534, security policy application 602 and monitoring application 603 assume that one or more of the unknown processes are also executing on at least one of virtual machines 521-526. The firewall rule(s) prevent those unknown processes from performing their intended function. For example, if an unknown process is designed to send information over Internet 471, then the firewall rule will block that communication and remedy the security threat posed by that information being sent.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of securing a logical network environment, the method comprising:
   in a workload orchestration platform:
      managing one or more logical networks that include a plurality of workloads and a plurality of shadow workloads, wherein one or more initial processes of the shadow workloads, when instantiated, are known to a security application;
      providing security permissions to the security application that enable the security application to manage the shadow workloads, wherein the security application monitors the shadow workloads to identify an unknown process, other than the initial processes, executing on one or more of the shadow workloads;
      providing admin permissions to an administrator application that enable the administrator application to manage the workloads while not allowing the administrator application to manage the shadow workloads; and
      blocking network traffic of the unknown process identified by the security application in the logical networks.

2. The method of claim 1, further comprising:
   from the security application, in response to a change in the workloads, instantiating one or more of the shadow workloads using the workload orchestration platform.

3. The method of claim 2, wherein at least one of a group comprising pre-defined templates and heuristic models define how the one or more shadow workloads should be instantiated based on the change.

4. The method of claim 1, wherein the security application monitors the logical networks for anomalous activity.

5. The method of claim 4, wherein the security permissions further enable the security application to manage the logical networks.

6. The method of claim 5, wherein blocking the network traffic comprises:
   implementing a firewall rule.

7. The method of claim 1, wherein the first logical networks include at least one shadow network that includes at least one of the shadow workloads and no other workloads.

8. The method of claim 1, wherein the workload orchestration platform does not allow the administrator application to be aware of the shadow workloads based on the admin permissions.

9. The method of claim 1, wherein the admin permissions prevent the administrator application from affecting the shadow workloads.

10. The method of claim 1, wherein the workloads and the shadow workloads comprise virtual machines.

11. A apparatus for securing a logical network environment, the apparatus comprising:
   one or more computer readable storage media;
   one or more processors operatively coupled with the one or more computer readable storage media; and
   program instructions stored on the one or more computer readable storage media that, when read and executed by the one or more processors, direct the apparatus to:
      provide at least a portion of a workload orchestration platform;
      in the workload orchestration platform:
         manage one or more logical networks that include a plurality of workloads and a plurality of shadow workloads, wherein one or more initial processes of the shadow workloads, when instantiated, are known to a security application;
         provide security permissions to the security application that enable the security application to manage the shadow workloads, wherein the security application monitors the shadow workloads to identify an unknown process, other than the initial processes, executing on one or more of the shadow workloads;
         provide admin permissions to an administrator application that enable the administrator application to manage the workloads while not allowing the administrator application to manage the shadow workloads; and
         block network traffic of the unknown process identified by the security application in the logical networks.

12. The apparatus of claim 11, wherein the program instructions further direct the apparatus to:
   from the security application, in response to a change in the workloads, instantiate one or more of the shadow workloads using the workload orchestration platform.

13. The apparatus of claim 12, wherein at least one of a group comprising pre-defined templates and heuristic models define how the one or more shadow workloads should be instantiated based on the change.

14. The apparatus of claim 11, wherein the security application monitors the logical networks for anomalous activity.

15. The apparatus of claim 14, wherein the security permissions further enable the security application to manage the logical networks.

16. The apparatus of claim 15, wherein to block the network traffic, the program instructions direct the apparatus to:
   implement a firewall rule.

17. The apparatus of claim 11, wherein the logical networks include at least one shadow network that includes at least one of the shadow workloads and no other workloads.

18. The apparatus of claim 11, wherein the workload orchestration platform does not allow the administrator application to be aware of the shadow workloads based on the admin permissions.

19. The apparatus of claim 11, wherein the admin permissions prevent the administrator application from affecting the shadow workloads.

20. One or more non-transitory computer readable storage media having program instructions stored thereon for securing a logical network environment, the program instructions, when read and executed by one or more processors, direct the one or more processors to:
   provide at least a portion of a workload orchestration platform;
   in the workload orchestration platform:
      manage one or more logical networks that include a plurality of workloads and a plurality of shadow workloads, wherein one or more initial processes of the shadow workloads, when instantiated, are known to a security application;
      provide security permissions to the security application that enable the security application to manage the shadow workloads, wherein the security application monitors the shadow workloads to identify an unknown process, other than the initial processes, executing on one or more of the shadow workloads;
      provide admin permissions to an administrator application that enable the administrator application to manage the workloads while not allowing the administrator application to manage the shadow workloads; and
      block network traffic of the unknown process identified by the security application in the logical networks.

* * * * *